June 7, 1949.    J. R. SCHOENBAUM    2,472,396
ELECTRICAL SPEED CONTROL SYSTEM
Filed Oct. 6, 1944    2 Sheets-Sheet 2
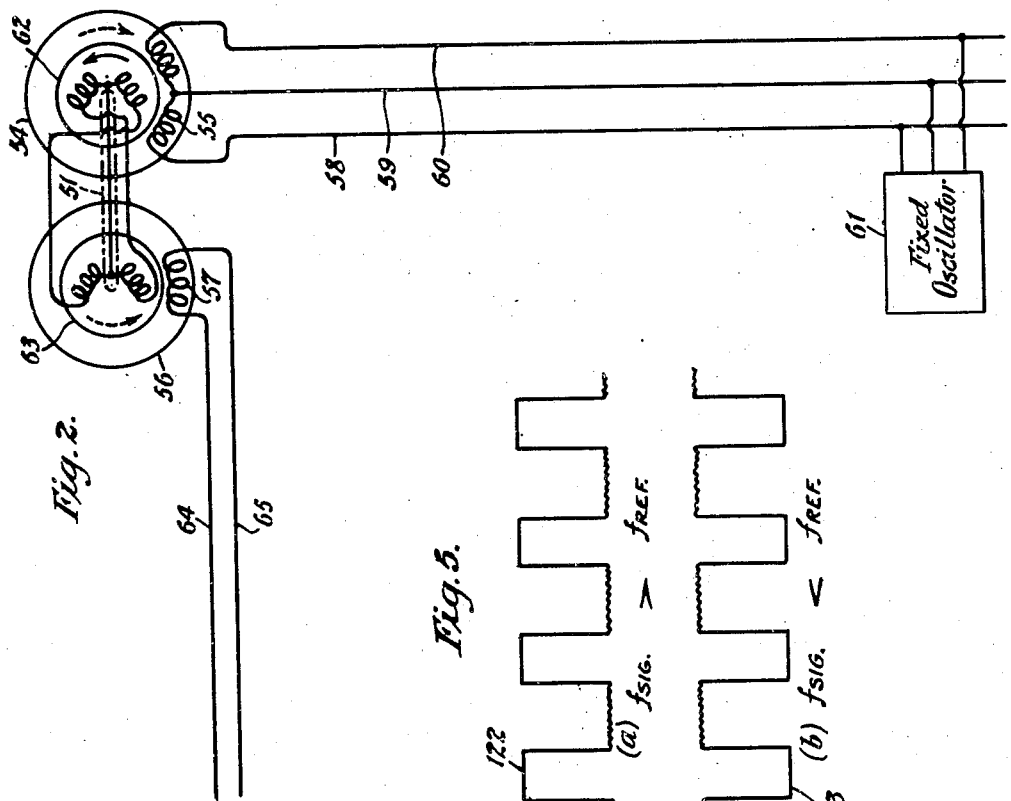
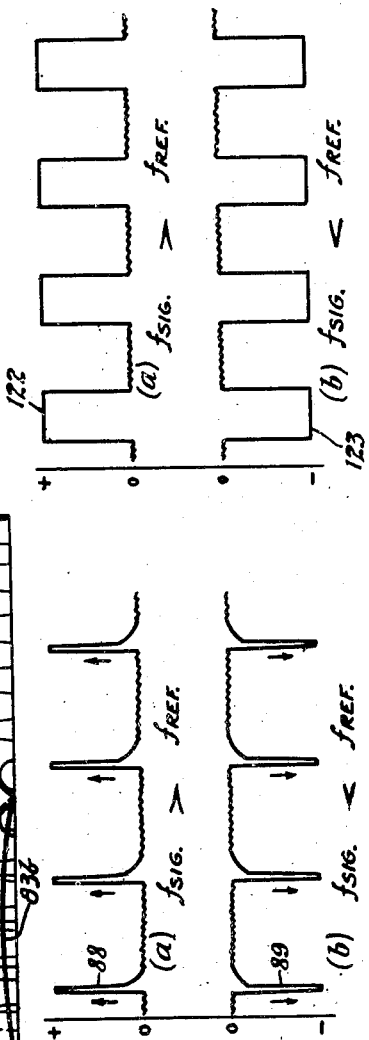
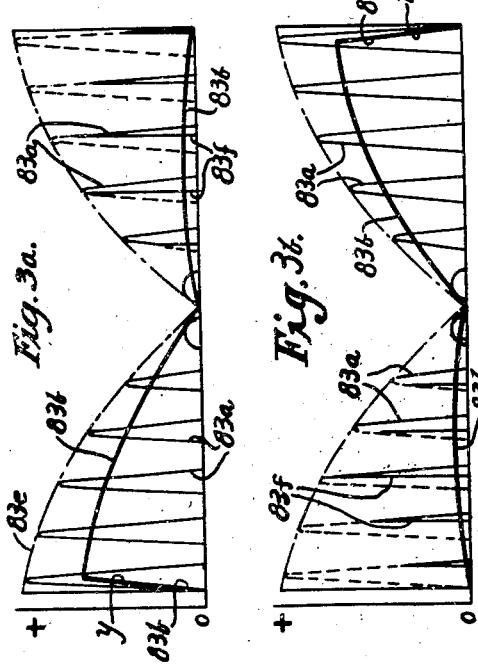
Inventor
JOSEPH R. SCHOENBAUM
Attorney Patented June 7, 1949

2,472,396

UNITED STATES PATENT OFFICE 2,472,396

ELECTRICAL SPEED CONTROL SYSTEM

Joseph R. Schoenbaum, Roseland, N. J., assignor to Curtiss-Wright Corporation, a corporation of Delaware Application October 6, 1944, Serial No. 557,534

2 Claims. (Cl. 175—355)

This invention relates to improvements in control systems for prime movers and is characterized by features which adapt it particularly, although not necessarily, for controlling the engine-propeller units of aircraft and for synchronizing the operation of such units when employed in multiple.

One object of the invention is to provide a system of the character described which is highly sensitive over wide speed ranges and which is automatically operative to effect the necessary corrections in the event a controlled prime mover exceeds or falls below the desired speed.

A further object is a system which is basically electronic in character, whereby to eliminate mechanism and thus not only reduce mechanical failure but also avoid losses as a result of friction and lags due to inertia.

A still further object is to provide a system which is responsive to frequency, or speed, deviations in accordance to the magnitude of such deviations, whereby to avoid any tendency of the controlled prime movers to hunt.

A still further object is to provide a system which, when availed of for synchronizing purposes, will be operative accurately to hold the frequency, or speed, of the controlled prime movers at the desired level and cause them to follow in synchronism any change in such level.

A still further object is a novel design and arrangement of the component parts of the system, whereby to obtain economy, compactness and simplicity in design and minimize assembling, testing and adjusting operations.

The invention is illustrated in the accompanying drawings, wherein:

Figure 2 is a wiring diagram of the modulator shown in Figure 1;

Figures 3a and 3b are diagrammatic views of a beat cycle showing the formation of pulses having a discontinuity reversible characteristic; and Figures 4 and 5 are diagrammatic views of the wave forms of the pulses which furnish the energy for effecting the necessary frequency, or speed, changes, the pulses being shown as differentiated and lengthened.

Figure 1:
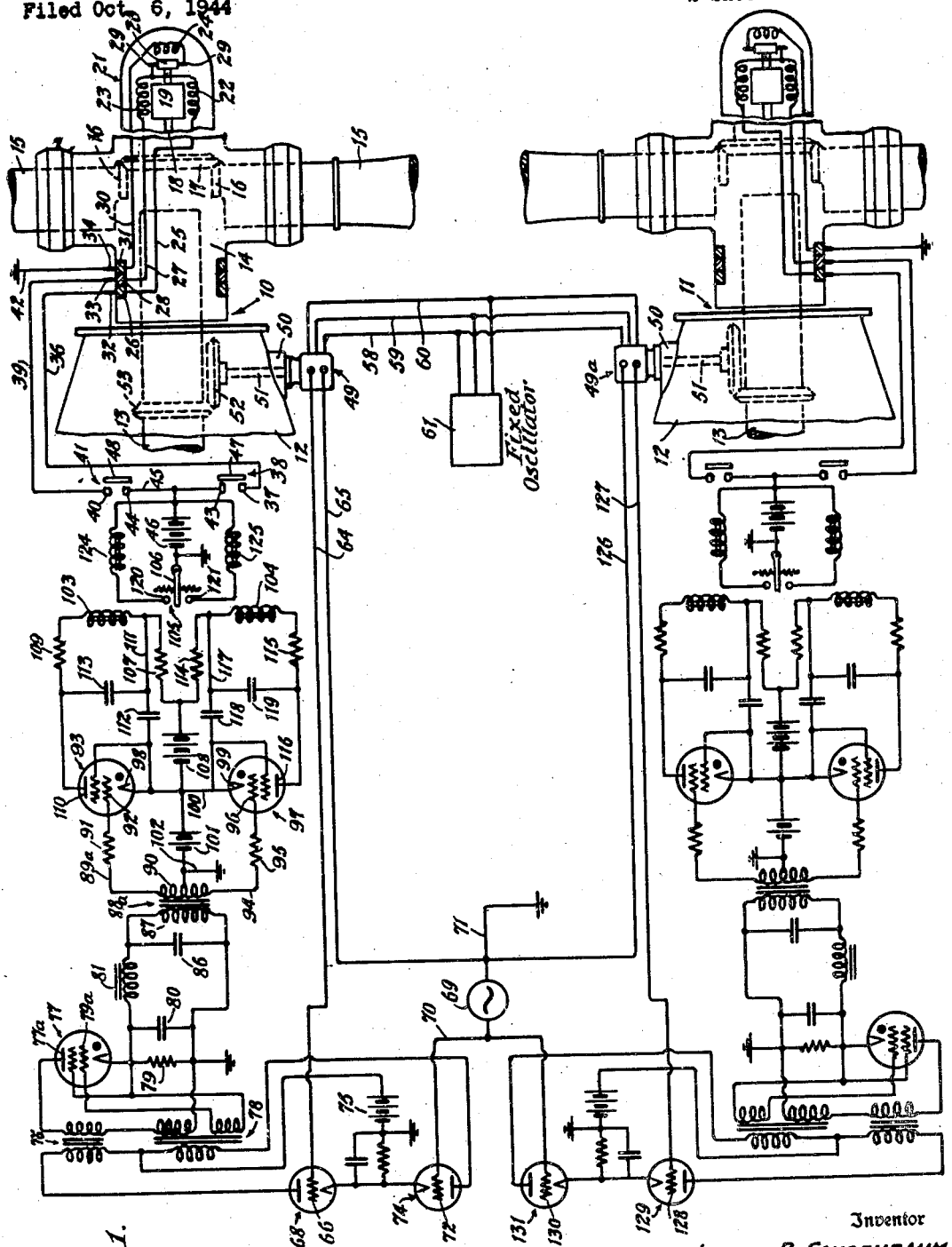
Figure 1 is a wiring diagram of a synchronizing system embodying the features of the invention.

The system may be employed in connection with a single engine-propeller unit, in which case it serves as a governor, or it may be availed of in connection with a plurality of such units as a synchronizer. It is illustrated in the latter capacity, being shown in connection with similar engine-propeller units 10 and 11. It is understood, of course, that the showing of two such units is intended by way of example only and that any desired number may be caused to operate in synchronism.

The engine of each of the engine-propeller units is sufficiently indicated for the purpose in view by a showing of the nose section 12 and the drive shaft 13 which extends through the nose section, the hub 14 of the propeller of the unit being splined or otherwise secured upon the end of the drive shaft and carrying blades 15. The propeller is of the electric, variable-pitch type, the root ends of the blades 15 being journaled in the hub and carrying bevel gears 16 which mesh with a ring gear 17. The latter is connected through suitable reduction gearing (not shown) to a shaft 18 which carries the armature 19 and commutator 20 of an electric motor 21. The latter is reversible, having oppositely wound field coils 22 and 23 and a brake disengaging coil 24. A conductor 25 connects one end of the field coil 22 to a slip ring 26 on the inner end of the propeller hub while a conductor 27 connects the corresponding end of the field coil 23 to a similar slip ring 28, the opposite ends of the two field coils being connected to one of a set of brushes 29. One end of the brake disengaging coil 24 is connected to the other of the brushes 29 while its opposite end is connected by a conductor 30 to a third slip ring 31. Brushes 32, 33 and 34 cooperate with the slip rings 26, 28 and 31, respectively, a conductor 36 connecting the brush 32 to one contact 37 of a switch 38, a conductor 39 connecting the brush 33 to one contact 40 of a switch 41 while the brush 34 is grounded by a line 42. The other contact 43 of the switch 38 and the other contact 44 of the switch 41 are connected by a common line 45, which, in turn, is connected to one side of a battery 46. It will thus be apparent that when the switch 38 is closed by engagement of the movable member 47 thereof with the contacts 37 and 43, the field coil 22 of the motor 21 will be energized to cause rotation of the armature of the motor in one direction while when the switch 41 is closed by engagement of the movable member 48 thereof with the contacts 40 and 44, the field coil 23 will be energized to cause rotation of the armature of the motor in the opposite direction. The pitch of the blades 15 may, therefore, be increased by closing one of the switches 38, 41 and decreased by closing the other of the said switches, it being noted in this connection that the coil 24 is connected in series with the particular field coil which is energized and hence that the brake, which normally resists rotative movement of the motor armature, is disengaged simultaneously with the energization of either of the field coils so that free rotary movement of the armature will be permitted. Although the electric propellers shown and described are of standard design, it is to be understood that the control system hereinafter described is not limited to propellers of this or any other particular type.

As illustrated, the control system includes modulators 49 and 49a, the former being associated with the engine-propeller unit 10 while the latter is associated with the unit 11. The modulators are mounted on suitable pads 50 formed, or provided, for this purpose on the nose sections of the engines of the units 10 and 11 and include drive shafts 51 which are connected by gears 52 and 53 to the shafts 13. Each modulator may, as illustrated in Figure 2, include a stator 54 having a two-phase, input winding 55 and a stator 56 having a single-phase, output winding 57, lines 58, 59 and 60 connecting the winding 55 to a two-phase oscillator 61 having a predetermined constant frequency output. The shaft 51 of the modulator carries dual, two-phase rotors 62 and 63 magnetically shielded from one another and having the same number of poles as the stator 54, the rotor windings being connected so as to reverse the direction of phase rotation. The shaft 51 drives the rotors in a direction counter to the direction of rotation of the multi-phase field of the winding 55, the direction of rotation of the rotors being indicated by the solid arrow and the direction of rotation of the electric fields being indicated by the dotted arrows. A polyphase signal having a frequency equal to the input frequency plus the number of pairs of poles times the rotational speed of the shaft 51 is, therefore, produced in the winding of the rotor 62. As the winding of the latter is coupled to the winding of the rotor 63 so that the phases are reversed, a frequency will be produced in the output winding of stator 56 which is equal to the input frequency plus 2N times the speed of rotation of the shaft 51, where N is the number of poles. The use of a modulator of the character described has the advantage that relatively high frequencies may be produced with a minimum number of poles per stator-rotor combination and without the aid of slip rings. Each modulator thus produces a signal frequency of a frequency equal to the sum of the fixed oscillator frequency and the frequency developed by the rotating engine so that the frequency varies as the speed of the drive shaft of the engine-propeller unit with which it is associated but through a range as elevated by the fixed oscillator frequency. A line 64 connects one side of the output of the modulator 49 to the grid 66 of a preamplifying tube 68, Fig. 1, while the other side of the modulator is connected by a line 65 to ground. A reference oscillator 69, which is connected between a grid line 70 and a ground line 71, furnishes a reference frequency which is applied to the grid 72 of a pre-amplifying tube 74, the plate voltage of the tubes 68 and 74 being furnished by a common battery 75. A transformer 76 couples the plate circuit of the tube 68 and the plate circuit of a gas-filled tube, or thyratron 77, while a transformer 78 couples the plate circuit of the tube 74 to the plate circuit of the tube 77. Thus, the signal and reference frequencies, after being stepped up in voltage, are applied to the plate 77a of the tube 77 since the secondaries of transformers 76 and 78 are serially connected. The transformer 78 has another secondary connected to the grid 79a of the thyratron 77 and this circuit is arranged so that the reference imposed on the grid will be in opposed phase relation to the reference frequency added to the signal frequency as imposed on the plate 77a.

The reference oscillator 69 may be of any suitable type, having a frequency range corresponding to a predetermined engine-speed range, and may be calibrated directly in R. P. M. It will be apparent, therefore, that the voltage on the plate 77a of the tube 77 will vary as a function of the beat between the signal and reference frequencies while the grid voltage will have substantially uniform variation at reference frequency. In this connection it is to be understood that the invention not only contemplates the application of both the signal and reference frequencies to the plate of the tube with either also applied to the grid, but also the application of both frequencies to the grid with either also applied to the plate; or the application of either frequency alone to the plate and the other alone to the grid. The voltage across the plate to cathode resistor 79 will, during conducting periods of the tube 77, depend upon which frequency combination is employed and upon whether the signal frequency is equal to, greater, or less than the reference frequency. Reference may now be made to Figs. 3a and 3b which are based upon the application of the sum of the signal and reference frequencies to the plate 77a of the tube 77 and which are also based upon the application of the reference frequency to the grid 79a of the tube 77, the reference frequency applied to the grid however being 180 degrees out of phase with the reference frequency which is combined with the signal frequency and applied to the plate. This arrangement is attained by the two secondaries of the transformer 78 wherein one winding is series connected with the secondary of the transformer 76 and wherein the other secondary of the transformer 78 provides grid voltage at reference frequency, this winding being arranged to have 180 degrees phase relation to the other secondary winding of the transformer 78. The plate current which would flow in the tube 77 if its grid were positively biased at all times would correspond to the full rectified waves indicated at 83a, within the envelope curve 83e, this envelope representing the beat frequency between signal and reference frequency. However, with grid control applied by voltage due to reference frequency in 180 degree phase relation to the other component of reference frequency applied to the plate, no current flows in the tube until the grid becomes sufficiently positive to fire the tube. When the signal frequency is different from the reference frequency the instant voltages across the cathode resistor 79 (before averaging to the forms 83b) are represented by the half waves 83a as modified at 83f in the right hand half of Fig. 3a and in the left hand half of Fig. 3b.

In the first half of the beat cycle shown in Fig. 3a where the signal voltage frequency exceeds the reference frequency, the grid is positive when the plate becomes positive at each half wave 83a and the thyratron "fires" through the entire half of each wave 83a. However, the amplitude of each successive half wave gradually decreases because of the plate voltage composition. In the second half of the cycle, the grid does not become positive to "fire" the tube until after each half wave has commenced, the delay before firing, as at 83f, varying in degree. At the end of the cycle where the amplitude of the half waves 83a is great, the grid becomes positive increasingly later towards the end of each half wave so that the average or integrated value of current passed during one complete beat cycle or wave may be represented by the curve 83b, commencing abruptly at y at the beginning of each cycle and increasing rapidly to a maximum, gradually diminishing to zero during the first half of the cycle, and remaining at a low value during the last half of the cycle or wave. At the end of the cycle, a positive half wave of grid voltage is completely opposed by a negative plate voltage so that no current flows through the thyratron. The next sharp wave front y occurs at the instant a positive half wave of grid voltage overlaps the initial portion of a positive half wave of plate voltage thereby "firing" the thyratron. The action is reversed where the signal frequency is less than the reference frequency as shown in Fig. 3b. There the average current 83b flowing during the first half of the beat cycle or wave is at a low value and gradually increases to a maximum at the end of the second half of the cycle or wave, where it abruptly terminates at w. An abruptly terminated wave front w occurs when a positive half wave of grid voltage slips past a positive half wave of plate voltage thereby cutting off the thyratron. The above described abrupt front changes occur whether the plate frequencies be made up solely of the signal frequency or both signal and reference frequencies as illustrated in the preferred circuit.

The sharply rising and sharply falling fronts y and w respectively represent the useful portions of the differential frequency pulses or waves, the direction of the wave fronts being determinative of whether the signal frequency is greater or less than the reference frequency and each such wave front representing one cycle of difference. Thus for each frequency differential the wave fronts will all be in the same direction and in number will be equivalent to the numerical difference between the signal and reference frequencies. At such times as the signal frequency corresponds to the reference frequency the amplitude of the voltage waves 83a will be substantially constant, their magnitude depending upon the phase relation between the two frequencies.

The circuit arrangement for obtaining steep front current pulses or waves of the type shown at 83b in Figs. 3a and 3b comprises a low pass π filter connected across the cathode resistance 79 and including condensers 80 and 86 and an inductance 81. This filter functions as a smoothing or integrating circuit in a well known manner for integrating the higher frequency pulses appearing across the cathode resistor so that the resulting wave form at the output terminals of the filter, i. e. the terminals of condenser 86, corresponds to that of the waves 83b, Fig. 3a or Fig. 3b as the case may be. It will be apparent therefore that the sharp or abrupt changes in the waves or pulses from the aforesaid integrating circuit are in one sense when the signal frequency is greater than the reference frequency and are in the opposite sense when the signal frequency is less than the reference frequency. The frequency of the abrupt wave fronts corresponds to the magnitude of the frequency difference. For the best results, the signal and reference frequencies should be high with relation to their difference range. If the two frequencies are multiples, the differential will not indicate whether the signal frequency is greater or less than the reference frequency. In this connection it is to be understood that, if preferred, the signal frequency may be obtained from a simple alternator, the latter replacing, and being driven in the same manner as, the modulator and having the same frequency range as the reference oscillator. The use of a modulator, however, has the advantage that the range of speed which is controllable is considerably increased. With a simple alternator the speed range will, in most instances, be limited to approximately 15% with respect to the center of the range of operation, or the range over which operation may be desired. While this may be satisfactory in some cases, in others it may be necessary to cover speed variations of several hundred per cent. The use of the modulator enables the axis of the reference frequency to be shifted so that while the speed of the drive shaft of the engine-propeller unit may vary over wide ranges, the frequency output will not vary more than 15% from the input to the modulator. The speed range which is controllable is, therefore, substantially increased by the use of the modulator.

For the purpose of modifying the integrated waves 83b so that they can be more effective for the purpose intended, they are preferably differentiated as to positive and negative direction of the abrupt wave fronts. To this end the waves are passed through a transformer 88a, the primary winding 87 of which also serves as the inductance of a tuned circuit including the condenser 86. This circuit is preferably resonant at a frequency about one-tenth the reference frequency. By reason of the rapid rise or decay of current in the primary 87 at a steep front y or w respectively, the corresponding rapid flux change at the transformer primary induces a voltage in the secondary winding 90 that is differentiated as to positive and negative pulses. The wave form of this induced voltage across the transformer secondary is peaked or sharpened into pulses as illustrated by Fig. 4 wherein the curves a represent for example positive pulses produced according to a sharply initiated current wave, Fig. 3a, and the curves b represent for example negative pulses produced according to a sharply terminated current wave, Fig. 3b. That is, since the magnitude and polarity of induced voltage in the transformer secondary is dependent respectively on the rate and direction of change of primary flux, it will now be apparent that the transformer 88a functions as a useful differentiating device for the waves or pulses 83b. The voltage induced by the gradually changing flux, as distinguished from the rapidly changing flux, is much lower in magnitude and is not a determining factor in the differentiation of the pulses.

The differentiated positive and negative pulses are now further modified for frequency control as desired, the arrangement in Fig. 1 including a pair of power tubes 93 and 97 responsive to positive and negative current inputs from the transformer secondary. A line 89a connects one side of the secondary 90 of the transformer through a grid-current limiting resistance 91 to the grid 92 of a gas-filled tube 93 while the other side of the secondary is connected by a wire 94 through a grid-current limiting resistance 95 to the grid 96 of a similar tube 97. The cathodes 98 and 99 of the two tubes are connected by a wire 100 which in turn is connected through a grid bias battery 101 to a center tap on the secondary 90 and to ground by a wire 102.

The tubes 93 and 97 control energization of opposing coils 103 and 104, respectively, of a polarized relay 105, the movable contact 106 of which is biased to the position shown and connected to ground. The coil 103 is included in the plate circuit of the tube 93, being in series with a resistance 107 which is connected to the positive side of a battery 108 and also being in series with a second resistance 109 which is connected to the plate 110 of the tube 93. A line 111, which is connected between the coil 103 and the resistance 107, is connected to one side of a condenser 112, the other side of which and the negative side of the battery 108 are connected to the cathode line 100. One side of a second condenser 113 is connected between the resistance 109 and the plate 110 while the other side is connected between the opposite side of the coil 103 and the condenser 112. In a like manner the coil 104 is included in the plate circuit of the tube 97, being in series with a resistance 114 which is connected to the positive side of the battery 108 and also being in series with a resistance 115 which is connected to the plate 116 of the tube 97. A line 117, which is connected between the coil 104 and the resistance 114, is connected to one side of a condenser 118, the other side of which is connected to the cathode line 100. One side of a cooperating condenser 119 is connected between the resistance 115 and the plate 116 while the other side is connected between the opposite side of the coil 104 and the condenser 118.

The grids of the tubes 93 and 97 are biased, as shown, so that oscillation will be prevented, the tubes being conductive only when the proper voltages are impressed upon their grids. Such voltages are furnished by the transformer 88a, it being apparent from the foregoing that pulses having a polarity in one sense will render the tube 93 conductive while pulses having a polarity in the opposite sense will render the tube 97 conductive. Thus when a differentiated pulse of the proper polarity is applied to the grid 92 of the tube 93 and the latter is thereby rendered conductive, a surge of current will flow through the coil 103 to move the contact 106 into engagement with a stationary contact 120 of the relay 105. For the purpose of controlling the operation time of the relay, means are provided for stopping tube conduction and for maintaining the relay coil 103 energized for a determinate time interval. A time delay circuit including the condenser 113 and resistance 109 is associated with the coil 103. When the tube 93 fires, the condenser 112 having been charged previously from the battery 108 through resistance 107, a discharge circuit for condenser 112 is completed through the tube 93 and the condenser 113 thus charging the condenser 113 until the voltages across the two condensers 112 and 113 divide as determined by their capacitance values. When the voltages become approximately equal the tube 93 cuts off since no voltage differential exists across it. After the tube 93 cuts off, the substantial charge on the condenser 113 discharges through the coil 103 and the resistor 109 at a rate determined in part by the value of the resistance 109, thus, while sufficient charge remains on condenser 113, maintaining the coil 103 energized and the contact 106 in engagement with the contact 120 for the desired interval. The coil 103 is de-energized after the charge on condenser 113 has decayed below a certain level.

After part of the charge on the condenser 112 has transferred to condenser 113, rebuilding of the charge on 112 is initiated by the battery 108 acting through the resistor 107, the value of the latter being chosen to recharge the condenser 112 in time to be ready for the next initiating pulse on the control grid of the tube 93.

The duration of pulses 122, Fig. 5, is accordingly comprised essentially of the decay time of the network including the elements 113, 109 and 103 since the conducting time of tube 93 is very short compared with the decay time. The pulses 123 are formed in the same manner as described above by operation of the tube 97 and its associated circuit components.

In a like manner, when the tube 97 is rendered conductive by the application of a pulse of the opposite polarity to the grid 96, there will be a surge of current through the coil 104 and, the latter being energized, the contact 106 will be moved into engagement with a stationary contact 121. The sudden flow of current through the resistances 114 and 115, which are in series with the coil 104, and the discharge of the condenser 118 drive the plate 116 negative and thus render the tube 97 non-conductive and restore the control of the grid 96. In this case also, the condenser 119 discharges through the coil 104 at a rate determined by the value of the resistance 115 and maintains the coil 104 energized and the contact 106 in engagement with the contact 121 for the desired period of time.

Thus it will be apparent that the periods during which the coils 103 and 104 are energized are not dependent upon the duration of the differentiated pulses and may, within limits, be predetermined independently by the selection of the proper values of the resistances 109 and 115 and the condensers 112, 113, 118 and 119. For example, for each differentiated pulse 88 or 89, as the case may be, a pulse 122 or 123 (Figure 5) of substantially greater duration may be caused to traverse a coil of the relay 105. When the difference between the signal and reference frequencies is low, the movable contact 106 of the relay will close momentarily for each cycle of difference and then open. On the other hand, if the difference between the signal and reference frequencies is substantial then the movable contact will remain closed as a new surge of current will be furnished the holding coil and the associated condensers before the latter lose their charge from the preceding surge. In other words, the movable contact will vibrate between open and closed positions when the differential frequency is low and assume a continuously closed position when the differential frequency is high.

The engagement of the contact 106 with the contact 120 energizes a solenoid 124 and the latter is thereupon operative to close the switch 41, thereby energizing one of the field coils of the motor 21. On the other hand, when the contact 106 is moved into engagement with the contact 121, a solenoid 125 is energized and the latter is operative to close the switch 38. When this occurs the other field coil of the motor 21 is energized. It will be apparent, therefore, that when the signal frequency is lower than the reference frequency, and the solenoid 124 is energized in response to the pulses of the differential frequency, the switch 41 will, as heretofore described, be closed intermittently or continuously, depending upon the magnitude of the difference, and the field winding 23 of the motor 21 will be energized. Thereupon, the motor will be caused to run in a direction which will decrease the pitch of the propeller blades. The load upon the engine being reduced, the speed of the latter will be increased so that the signal frequency put out by the modulator will likewise increase, the system being operative to continue the operation of the motor 21 until the pitch of the blades reaches an angle at which the corresponding speed of the engine results in a signal output from the modulator 49 which is of the same frequency as the reference frequency. When the signal frequency is higher than the reference frequency, and the solenoid 125 is energized in response to the pulses of the differential frequency, the switch 38 will be actuated and the field winding 22 of the motor will be energized. Energization of the field winding 22 will cause the motor 21 to run in a direction which will increase the pitch of the propeller blades. The load upon the engine being increased, the speed of the latter will be decreased so that the signal frequency put out by the modulator will be likewise decreased, the system being operative to continue the operation of the motor 21 until the pitch of the blades reaches an angle at which the corresponding speed of the engine results in a signal output from the modulator 49 which is of the same frequency as the reference frequency. The system, therefore, is automatically operative to adjust the pitch of the propeller blades so that the output frequency of the modulator will be the same as the reference frequency, if the reference frequency is fixed, and will follow the reference frequency when the latter is varied. In this connection it will be noted that whenever the signal frequency approaches the reference frequency the motor 21 will only be energized intermittently to effect step-by-step adjustment of the propeller blades. This has the advantage that over-adjustment, with resultant hunting, is avoided. At such times as the signal and reference frequencies correspond, the pitch of the propeller blades is correct and the engine will run at the desired speed. The system described, therefore, controls the speed of the drive shaft of the engine-propeller unit.

It is to be noted that the modulator 49a is similar to the modulator 49. However, being driven by the drive shaft of the engine-propeller unit 11 and receiving its excitation voltage from the fixed oscillator 61, the output signal from the modulator 49a will vary as, and be indicative of the speed of, the drive shaft of said unit. Lines 126 and 127 may, therefore, connect the output of the modulator 49a between the ground line 71 and the grid 128 of a preamplifying tube 129 while the output of the reference oscillator 69 may be connected between the grid 130 of a similar tube 131 and ground. The signal and reference frequencies so produced and amplified may be combined and modified in the same manner as described in connection with the control of the engine-propeller unit 10 and may be utilized to control the pitch of the blades of the propeller of the engine-propeller unit 11.

From the foregoing, it will be apparent that as the fixed oscillator 61 furnishes the excitation voltage for both modulators and as the same reference frequency is combined with the signal frequency produced by each of the engine-propeller units, the speed of the drive shaft of each such unit will not only be controlled but will be synchronized with the companion unit. It will be appreciated in this connection that in a like manner any number of engine-propeller units, or other prime movers, may be synchronized. Although the system shown and described makes no provision for manual control of propeller pitch, as distinguished from automatic control, this has been omitted not because manual control in conjunction with automatic control is not contemplated, or intended, but because it constitutes no part of the present invention.

As a non-limiting example of a range of frequencies found to be desirable in a particular embodiment of the invention, the engine alternator component of the modulator produces a frequency of 0 to 400 cycles per second for an engine speed range of 0 to 3000 R. P. M. The fixed oscillator 61 may produce a frequency of 4000 cycles. Thus the modulator frequency appearing across the wires 64, 65, comprising the sum of the fixed oscillator and engine alternator component frequencies, will range from 4000 cycles to 4400 for the engine speed range. The reference frequency produced from the reference oscillator 69 is adjustable between 4000 and 4400 cycles to provide a speed reference against which the output from the modulator 49 is compared through the circuit system above described.

It is to be understood that the form of the invention described herein is intended by way of example only and that various other embodiments, all within the purview of the invention, may be suggested, and availed of, in connection with various other adaptations.

What is claimed as new and desired to be secured by Letters Patent is:

1. A frequency responsive system for controlling the speed of a prime mover comprising a source of reference frequency alternating current energy, a frequency source controlled by said prime mover, to produce a frequency proportional to prime mover speed, an oscillation generator operable at fixed frequency, means to add said prime mover and oscillator frequencies to constitute a source of variable frequency alternating current energy of a frequency in the range of the frequency of the reference frequency energy source and varying with the speed of said prime mover, means acting in response to both said reference and variable energy means for producing current impulses proportional in number to the frequency of the beat between said frequencies, means to form said pulses with abrupt beginnings or terminations according to whether the variable frequency is greater or less than the reference frequency, and means responsive to the abrupt beginning or termination in said pulses to produce a potential the sense of which varies according to an abrupt initial or terminal pulse characteristic respectively, and means for varying the speed of said prime mover in substantially fixed increments corresponding to the number of said pulses and in direction according to the sense of said potential.

2. A frequency responsive system for controlling the speed of an engine comprising a generator for producing a frequency proportional to engine speed, a source of constant frequency higher than the engine frequency, means to add the engine and constant frequencies to produce a modulated relatively high frequency whose spread, throughout the engine speed range, causes a relatively small percentage variation in the modulated frequency, as compared with the percentage variations in engine frequency resulting from corresponding engine speed changes; means for generating an adjustable reference frequency of the same order of magnitude as said modulated frequency, means for combining said reference and modulated frequencies to produce a series of beat pulses whose frequency corresponds to the numerical difference between the reference and modulated frequencies, means to form said pulses differently accordingly as the reference frequency is greater or less than the modulated frequency, and sensing means responsive to the individual formed pulses to regulate said engine speed to a higher or lower value accordingly as the modulated frequency is lower or higher than the reference frequency to bring said modulated frequency into consonance with said reference frequency.

JOSEPH R. SCHOENBAUM.

REFERENCES CITED

The following references are of record in the file of this patent:

UNITED STATES PATENTS

| Number | Name | Date |
| --- | --- | --- |
| 1,490,958 | Bown | Apr. 22, 1924 |
| 1,553,407 | Staege | Sept. 15, 1925 |
| 1,553,408 | Staege | Sept. 15, 1925 |
| 2,176,742 | La Pierre | Oct. 17, 1939 |
| 2,246,516 | Herzog | June 24, 1941 |
| 2,258,462 | Martin | Oct. 7, 1941 |
| 2,302,042 | Martin | Nov. 17, 1942 |
| 2,308,620 | Lear | Jan. 19, 1943 |
| 2,325,927 | Wilbur | Aug. 3, 1943 |
| 2,382,847 | Baumann | Aug. 14, 1945 |
| 2,408,451 | Sorenson | Oct. 1, 1946 |